United States Patent [19]
Taylor

[11] Patent Number: 4,724,857
[45] Date of Patent: Feb. 16, 1988

[54] PRESSURE RELIEF VALVE

[76] Inventor: Julian S. Taylor, 8300 SW. 8, Oklahoma City, Okla. 73128

[21] Appl. No.: 931,305

[22] Filed: Nov. 17, 1986

[51] Int. Cl.⁴ .............................................. F16K 13/04
[52] U.S. Cl. ....................................... 137/67; 137/70; 137/71; 137/538
[58] Field of Search ..................... 137/68.1, 67, 70, 71, 137/538

[56] References Cited

U.S. PATENT DOCUMENTS

| | | | |
|---|---|---|---|
| 1,740,422 | 12/1929 | Snow | 137/71 |
| 2,047,750 | 7/1936 | Smith | 137/71 |
| 2,236,564 | 4/1941 | Cornell | 137/71 |
| 2,587,933 | 3/1952 | Volpin | 137/70 |
| 3,424,181 | 1/1969 | Morse | 137/68.1 |
| 4,317,470 | 3/1982 | Taylor | 137/71 X |
| 4,530,373 | 7/1985 | Bork | 137/538 X |

*Primary Examiner*—Harold W. Weakley
*Attorney, Agent, or Firm*—Robert K. Rhea

[57] ABSTRACT

A valve body having a lateral exhaust port is provided with a valve movable toward and away from a fluid inlet sealing face at its pressure connected end and guided by a valve stem projecting through the other end of the body and terminating in spaced relation with respect to a cap closing the end of the body opposite its inlet port. An axially collapsible member is axially interposed between the downstream end of the valve stem and the cap to normally maintain the flow passageway between the ports closed. Excessive fluid pressure against the valve at the inlet port collapses the collapsible member, unseats the valve and opens the fluid discharge passageway.

5 Claims, 5 Drawing Figures

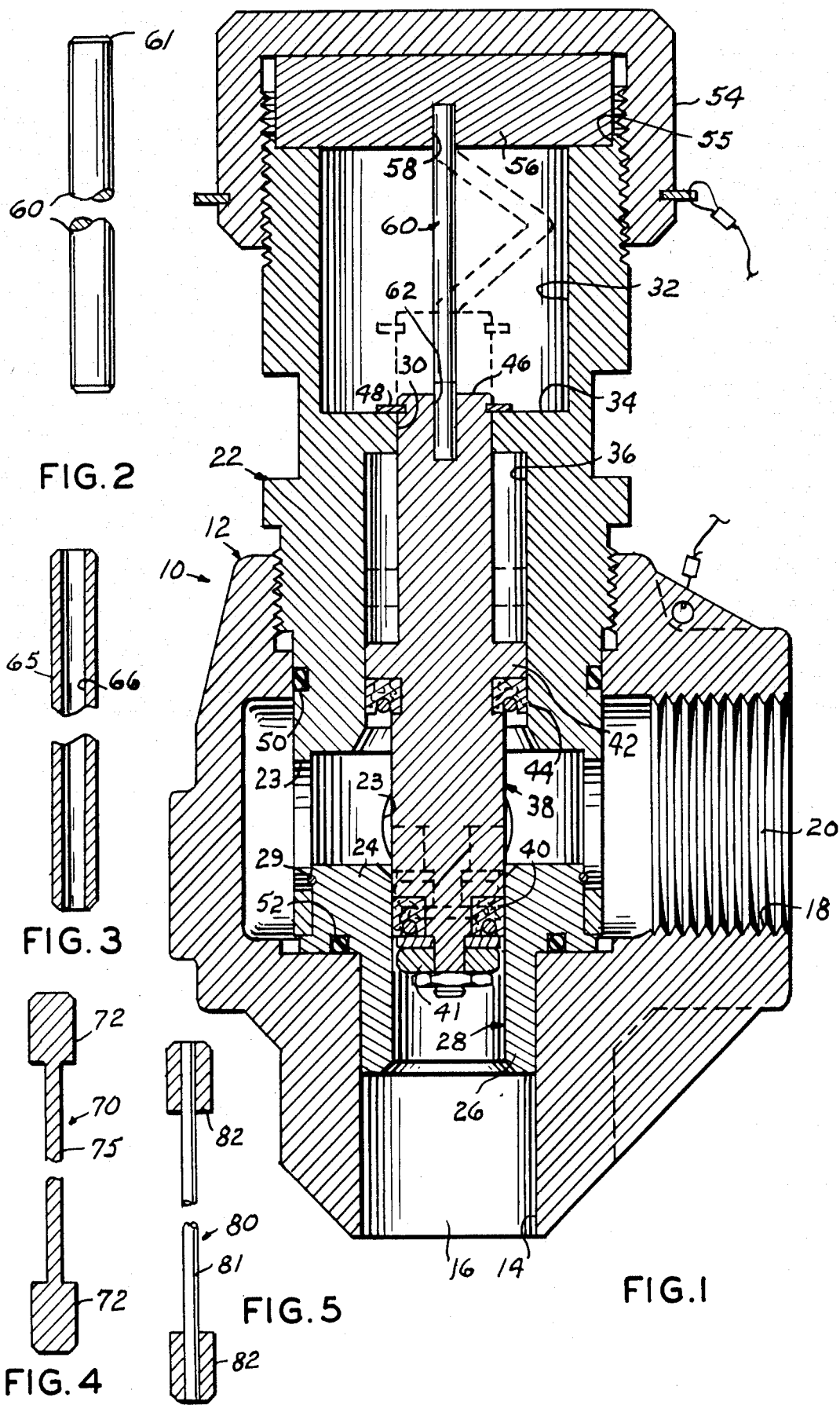

4,724,857

PRESSURE RELIEF VALVE

BACKGROUND OF THE INVENTION

1. Field of the Invention

The present invention relates to fluid pressure relief valves.

Relief valves are conventionally used in fluid pressure systems for the purpose of protecting the fluid pressure generating equipment, such as a cylinder, cylinder heads, bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment. This invention provides such a relief valve.

2. Description of the Prior Art

Fluid pressure relief valves presently in use and as disclosed by prior patents generally relate to valve structure which includes a valve stem or mandrel moved longitudinally in response to predetermined fluid pressure which shears a pin or ruptures a frangible disk, or the like. The pressure setting in which these valves open to release such pressure is predetermined by the pressure necessary to shear the shear pin or rupture the frangible disk. The pressure at which such a valve opens is thus predetermined by the known rating or shearing force required to shear a pin or rupture a frangible disk of predetermined thickness.

Shear type valves are dangerous in that they can be rendered inoperative by a workman, tired of resetting the valve, putting more than one shear pin or nail through the shear bar on one type safety relief valve or using extra strong metal, such as an Allen wrench through the shear stem in another type shear relief valve. Rupture disks have the disadvantage of being difficult to service in the field after rupture.

Rather than a frangible disk or shear pin this invention provides a relief valve in which fluid pressure axially collapses a single strand wire-like pin, shaft or tube. Nothing in the line has to be disturbed during resetting as the piston seal can be reset external to the valve cavity.

So far as I know prior patents do not disclose a relief valve which axially collapses a pressure responsive member in response to a predetermined pressure.

SUMMARY OF THE INVENTION

A valve body is provided with an axial bore forming an inlet port and a lateral bore intersecting the axial bore and forming an outlet port and a fluid passageway between the ports. A valve cage is received by the axial bore opposite the inlet port and forms a valve seat slidably receiving a valve normally sealed with the seat. The bore of the cage is diametrically enlarged at its end portion opposite the inlet port which is closed by a cap and cap plate. An elongated pin or rod is axially interposed between the cap plate and stem of the valve and nested at its respective end portions by sockets therein for normally maintaining the valve sealed with its seat. Excessive fluid pressure above a predetermined value at the inlet port forces the valve means toward the cap collapsing the pin or rod in a lateral bending action to open the fluid passageway.

The principal object is to provide a pressure relief valve which axially collapses a rod at a predetermined pressure and in which the collapsed rod is contained by the valve until manually replaced and the valve reset.

BRIEF DESCRIPTION OF THE DRAWINGS

FIG. 1 is a vertical cross sectional view of the relief valve and illustrating its pressure opened position by dotted lines;

FIG. 2 is a fragmentary elevational view, to a larger scale, of the collapsible rod, per se; and, FIGS. 3, 4 and 5 are longitudinal cross section views of alternative embodiments of the collapsible rod.

DESCRIPTION OF THE PREFERRED EMBODIMENTS

Like characters of reference designate like parts in those figures of the drawings in which they occur.

In the drawings:

The reference numeral 10 indicates a valve which is elongated tubular in general configuration comprising a body 12 having an axial bore 14 forming a fluid inlet port 16 and a lateral bore 18 intersecting the axial bore and forming an outlet port 20 and a fluid passageway between the ports. Obviously the inlet end portion of the valve body may be provided with conventional internal or external threads or a flanged end, neither being shown. At its end portion beyond its intersection with the lateral bore, the axial bore is counterbored for receiving one end portion of a valve cage 22 which axially projects beyond the valve body opposite the valve inlet port. The inward end of the cage is provided with a plurality of wall ports 23 and axially supports a valve seat 24 having a sleeve-like portion 26 peripherally nested by the wall forming the inlet port. The bore of the sleeve portion forms a cylindrical valve sealing surface 28. The outer wall of the valve 24 is joined to the inner wall of the cage by a retaining wire 29. The other end portion of the cage is axially bored, as at 30, and counterbored, as at 32, on a diameter relatively large when compared with the bore 30 or the inlet port 16, defining a counterbore end surface or shoulder 34 for the purposes presently explained.

Upstream a selected distance from the counterbore 32 the cage is further counterbored, as at 36, on as selected diameter for slidably receiving a valve means 38. The valve means 38 is generally elongated cylindrical with its upstream end portion diametrically reduced and surrounded by a primary sealing ring 40, secured by nut means 41, for sealing with the valve seat 28. Intermediate its ends and within the counterbore 36, the valve 38 is provided with a diametrically enlarged portion 42 slidable in the counterbore 36 and supporting secondary sealing means 44 sealing with the wall forming the counterbore 36. The end portion 46 of the valve stem is slidable in the cage bore 30 and movement of the valve means 38 toward the inlet port 16 is stopped by a snap ring 48 secured to the valve stem 46 adjacent the shoulder 34.

Other seals, such as the O-rings 50 and 52, respectively, seal the periphery of the cage and valve seat with the valve body.

The end portion of the cage opposite the inlet port 16 is externally threaded for receiving a valve body cap 54. This end surface of the cage wall is coaxially counterbored a selected depth to define an annular shoulder 55. A cap plate 56 is coaxially nested by the shoulder 55 and is interposed between the valve cap and adjacent end of the cage. The plate 56 is provided with an axial socket 58. A pressure collapsible member, such as a rod 60, is interposed between the cap plate and adjacent end of the valve stem 46, the valve stem 46 being similarly axially bored to form a socket 62. The sockets 58 and 62 nests respective end portions of the member 60. The rod 60, preferably formed from metal, may be a common nail or a length of metallic tubing. The rod 60 is usually referred to as a pin and its diameter, length and axial compressive resistance is predetermined for controlling a predetermined fluid pressure against the valve at the inlet port.

As illustrated by FIG. 2, the pin 60 is right circular cylindrical, but may be of other transverse cross section, if desired. The respective ends of the pin are chamfered, as at 61, to eliminate burrs and insure uniformity. Similarly, the end walls defining the inward limit or bottom of the axial bores 58 and 62 must be flat and normal to the longitudinal axis defined by these bores. Obviously, the diameter of the bores 58 and 62 and the spacing therebetween must cooperate with a close minimum tolerance but permitting manual installation and removal of the pin.

Referring also to FIGS. 3, 4 and 5 and as mentioned hereinabove the pin may comprise a tube as indicated at 65 (FIG. 3). The periphery and end surfaces of the tube are sized as described for the pin 60 and the diameter of its bore 66 selected in accordance with the required wall thickness for this tube for its failure or collapse at a predetermined fluid pressure against the valve means 38. The pin 70 (FIG. 4) is characterized by cylindrical end lugs 72 equally sized with respect to the pin 60. The pin 70 is diametrically reduced coaxially in the spacing between the lugs 72, as at 75, on a selected diameter for failure or collapse at a predetermined fluid pressure against the valve means.

The other pin embodiment, indicated at 80, is formed from a length of metallic rod material 81 symetrical about its longitudinal axis and having a predetermined resistance to collapse or failure by pressure in an axial direction. The rod is of equal length with respect to pin 60 but diametrically substantially smaller. A pair of sleeves 82 having an outside diameter closely nested by the confronting sockets 58 and 62 and a length substantially equal to the depth of these sockets, closely surrounds the respective end portion of the rod 81.

By way of example, the ratio of length to diameter of the pin is greater than 7:1. The ratio of the diameter of the sleeve sealing surface 28 to the diameter of the rod 60 is greater than 3:1. When the pin is a tube, its bore to outside diameter ratio is greater than 1:12.

Fluid pressure above a predetermined value against the upstream end of the valve means 38 collapses the pin 60 by axial movement of the valve means 38 toward the cap 52, which laterally bends or displaces the pin 60 in a doubled back upon itself action between its ends as illustrated by dotted lines.

The valve is reset after pin collapse by simply removing the cap 54 and plate 56. The failed rod or pin 60 is discarded, the valve means 38 replaced to the solid line position of the drawings and the cap plate 56 and cap 54 are installed.

Obviously the invention is susceptible to changes or alterations without defeating its practicability. Therefore, I do not wish to be confined to the preferred embodiment shown in the drawings and described herein.

I claim:

1. A pressure relief valve, comprising;
   a valve body having an axial bore forming an inlet port at one end and having a lateral bore intersecting the axial bore for forming an outlet port and a flow passageway between the ports;
   a valve seat in the inlet end portion of the flow passageway;
   valve means slidable in the axial bore and normally sealed with said seat for closing the flow passageway;
   valve cap means for closing the end of the axial bore opposite the inlet port; and,
   collapsible means including an elongated rigid member coaxially interposed between valve cap means and said valve means for normally maintaining said flow passageway closed.

2. The relief valve according to claim 1 in which the axial bore in said body opposite the inlet port is diametrically enlarged to permit lateral collapsing movement of said collapsible means.

3. The relief valve according to claim 2 in which the collapsible member comprises: an elongated pin.

4. The relief valve according to claim 1 in which the valve cap means further includes:
   a valve cap; and,
   a cap plate interposed between said cap and the collapsible means.

5. The relief valve according to claim 6 in which the valve means and cap plate are axially bored centrally to form confronting cylindrical sockets axially aligned with the valve body inlet for closely nesting respective end portions of said pin.

* * * * *